April 5, 1932.  G. E. SNOW  1,852,221
FEED MECHANISM FOR BLANKS
Filed Dec. 26, 1929   2 Sheets-Sheet 1
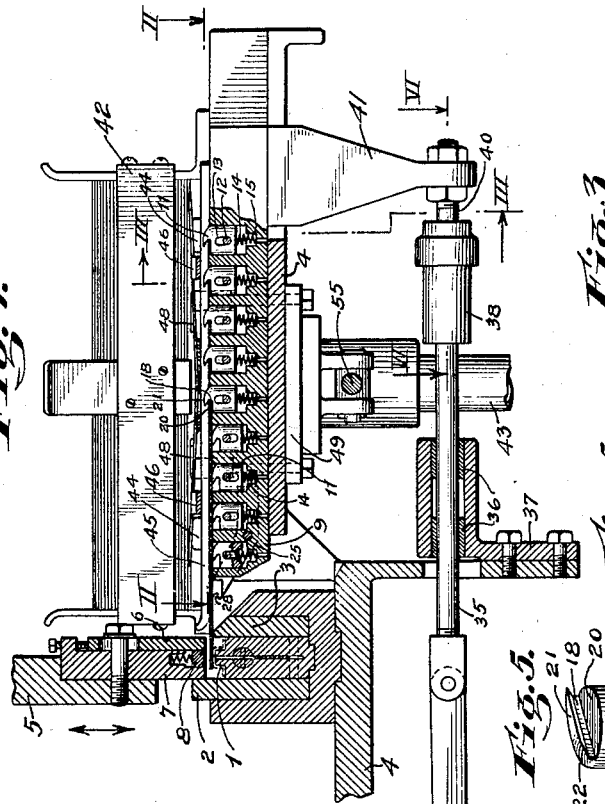

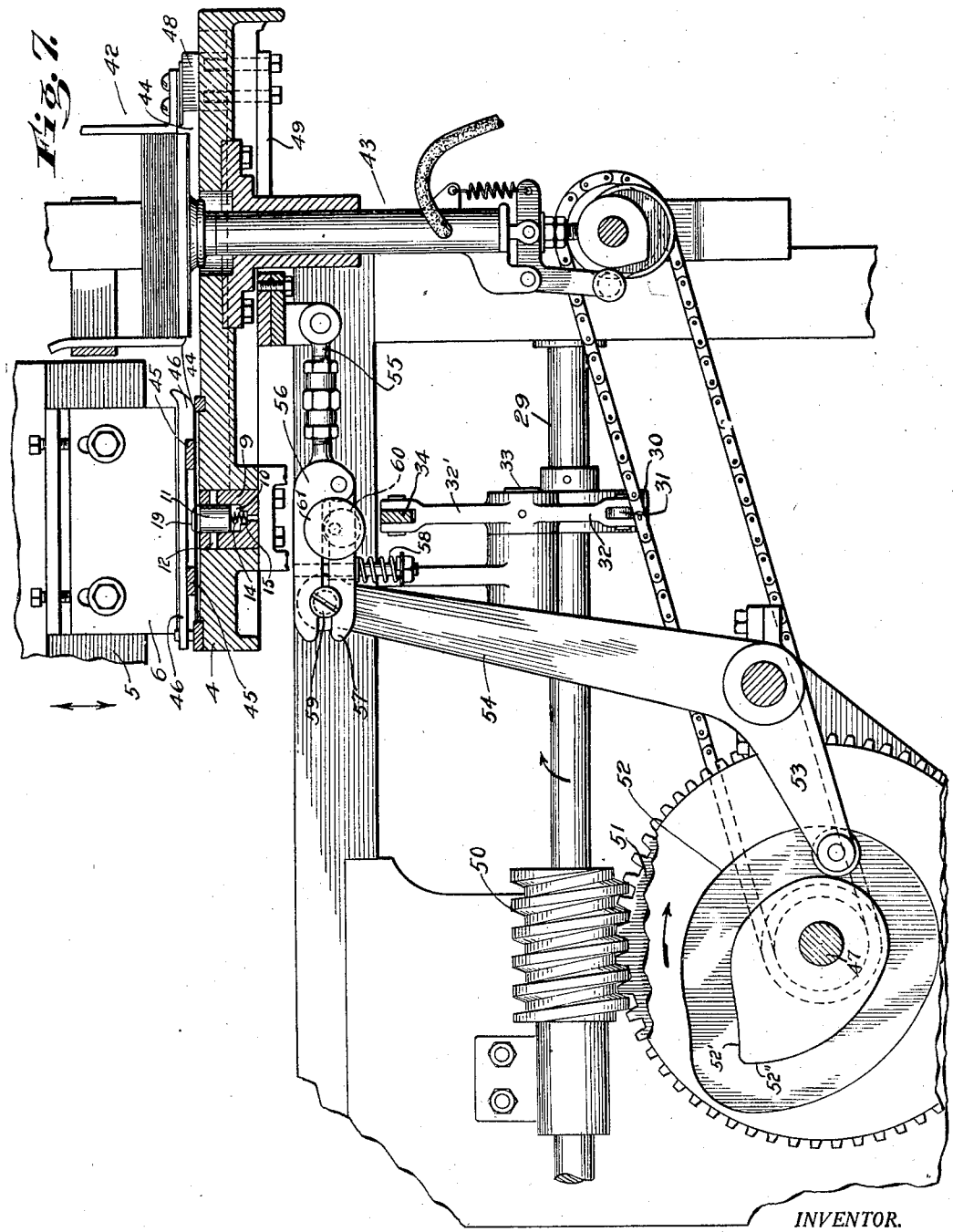

Patented Apr. 5, 1932

1,852,221

UNITED STATES PATENT OFFICE

GEORGE E. SNOW, OF MANCHESTER, CONNECTICUT, ASSIGNOR TO THE ORFORD SOAP COMPANY, INC., OF MANCHESTER, CONNECTICUT, A CORPORATION OF CONNECTICUT

FEED MECHANISM FOR BLANKS

Application filed December 26, 1929. Serial No. 416,563.

The invention relates to feed mechanism for blanks, and although of general application, is intended primarily as an improvement on sheet metal blank feed mechanism disclosed in the patent of Victor Hendrickson for machine for forming composite can bodies, No. 1,807,843, which issued June 2, 1931 on co-pending application Serial No. 39,903, filed June 27, 1925, and employed therein for feeding blanks direct to strip shearing and forming mechanism, and for feeding the main blanks to such direct feed. The object of the invention is to adapt the direct feed to narrower strips and to provide an accurate and dependable means for feeding a blank and blank remainders to shearing, or shearing and forming, dies.

The invention consists in the feed mechanism referred to and which is described in the specification and set forth in the appended claims.

Referring to drawings:

Fig. 1 is a transverse section through the blank shearing and initial strip-forming dies of the machine of the said patent showing the altered direct feed mechanism. This figure shows the feed stroke nearing its end.

Fig. 2 is a plan on the line II—II, Fig. 1.

Fig. 3 is a detail transverse section on the line III—III, Fig. 1, through the table and direct feed slide.

Fig. 4 is a detail side elevation, partly in section of the direct feed slide.

Fig. 5 is a detail perspective of one of the feed dogs and Fig. 5ª is a detail plan.

Fig. 6 is a detail section on the line VI—VI, Fig. 1, and

Fig. 7 is a section at right angles to the section on which Fig. 1 is taken showing the initial feed and associated mechanism.

In the machine of the said Hendrickson patent and incident to the production of composite can bodies consisting of fibrous blanks whose ends are secured together by sheet metal seaming strips, means is provided for forming such strips by shearing a main sheet metal blank into successive sub-blanks and forming the same into seaming strips of the desired cross section. This shearing and forming means, shown in Fig. 1 of the present application and illustrated only so far as deemed necessary, has a stationary die 1, stationary stop 2 and shearing plate 3 suitably supported from the table 4, a vertically reciprocating head 5 carrying co-operating shearing and forming plates 6—7 and spring-pressed clearer 8. The feeds to this mechanism are, as in the machine in the Hendrickson patent, a rapid reciprocating feed direct to the blank cutting-up and strip forming dies, and a less frequent initial or main blank reciprocating cross feed delivering the main blanks periodically to the direct feed as needed. The direct feed in Hendrickson included a feed slide reciprocable toward and from said dies and having a fore and aft series of overlapping pivoted feed dogs arranged in adjacent planes and capable of handling relatively narrow strips. In the new structure, in which also there is a multiplicity of feed dogs, the feed dogs are so formed and mounted as to be capable individually of limited sliding movement into and out of the plane of feed without other material displacement of their feed faces, only the foremost dog being pivoted. More exact control of the width of the strips may thus be effected and narrower strips may be handled with consequent saving of material.

In the drawings, the reciprocable feed slide 9 mounted in an extension of the table 4 is provided with a fore and aft series of uniformly spaced cavities 10 of the same size and shape in each of which is mounted a feed dog 11 slidable endwise therein but maintained against other movement sufficient in amount to reduce the efficiency of the feed below that required for the particular work to be performed in any given case. The illustrated structure, though not exclusive of equivalent constructions coming within the scope of the claims, is preferred since it is readily manufactured and assembled and is susceptible of being given a high degree of accuracy, limitation of the range of variation in strip width to two thousandths of an inch being found to be practicable. In this structure the cavities are cylindrical being reamed out to the desired diameter, and the dogs 11 are fitted therein so closely and are maintained in their proper locations so exactly that play is substantially eliminated. The dogs are positioned and their endwise movement limited by a series of parallel cross pins 12, each of which passes through aligned holes in the slide in the longitudinal axial plane of one of the bores and through a slot 13 in the longitudinal axial plane of the corresponding dog. The slot has a close sliding fit on the pin. Coil springs 14, whose ends are mounted in aligned recesses 15, 16 coaxial with the bores 10 and located respectively in the bottom of each bore 10 and in that of its dog 11, urge the dogs outward. To allow free endwise movement of the dog the bore or cavity which, in the illustrated structure, is otherwise closed below the dog is provided with a vent 17. Each of the feed dogs 11 has a feed face 18 maintained by the pin and slot mounting in a plane transverse of the longitudinal axis of the slide, and above said feed face, a lip 19 having its under side inclined downward and rearward to the feed face 18 and, in front of and below said face, a flat surface 20, preferably a little below the plane of the top of the feed slide, when the dogs are projected, this arrangement insuring a slight gripping of the rear edge of the blank by the successive dogs as they come into action. Each dog is thus provided with a feed recess in which the blank edge is received. The front portion of the top of the dog above the lip indicated by the reference numeral 21 Fig. 5 is preferably flat, or substantially so, the better to receive the blanks. The top of the dog is rounded or curved convexly from the back to the portion 21. In order to avoid danger of the edge of the main blank catching in the feed recesses of the respective dogs and to facilitate their depression by the blank out of its path, their tops are rounded on the side toward the reciprocatory initial feed, as indicated at 22 and as best shown in Figs. 2 and 5 in the former of which figures the meeting line of the curved portion of the top of the dog at the side toward the initial feed with the curved portion at the back is indicated by the lines 23 extending at an angle to the transverse dotted lines which represent the feed faces. It is not necessary to round over the side of the top of the dog on the side away from the main blank feed.

The rearmost dog shown in Fig. 2 differs from the rest in having its top cut away on the side toward the initial feed so that the flat portion 20 is extended inward almost to the central longitudinal plane of the slide and rearward to allow clearance for the rear corner of the new blank which is fed onto the feed dogs during the forward stroke of the slide 9 which delivers the final remnant of the old blank. This clearance enables the feed face of the rearmost dog to miss the rear edge of the main blank on this stroke, so that instead of striking the rear edge it passes in front of or along, the adjacent edge, which in the further cross feed of the blank comes into contact with the reduced rounded side portion of the rearmost dog adjacent the surface 20 and depresses and passes over that dog. The blank is fed by the rearmost dog to the shearing dies on the next forward stroke of the slide. This special treatment of the feed face of the rearmost feed dog is a departure from the construction shown in the Hendrickson patent in which, although the feed faces of all the feed dogs are of the same width, the relative timing is such that the feed face of the rearmost feed dog passes beyond the vertical plane of the rear edge of the blank before the blank touches the dogs. In the machine of the present application, as now built, the relative speeds of shafts 29 and 47 being unchanged and the main blank feed being as before, the reduction in the width of the strip and therefore of the blank results in a slight lengthening of the distance the feed face of the rearmost feed dog must travel from its retracted position before it reaches the rear edge of the main blank, as compared with the distance the feed face of the rearmost feed dog in the said Hendrickson patent must travel before it reaches the vertical plane of the rear edge of the main blank. This is true though this distance is reduced somewhat in the present case by a slight decrease in the stroke of the multi-dog feed slide. This shortening of the stroke has also a tendency to slightly retard the rear feed dog. Unless the timing were altered, its feed face, if of the same width as that of the other dogs, would be overlapped by the blank and would strike its rear edge.

The body of the foremost dog 24, which requires a wider range of movement than the others, is located in a recess at the side of the slide toward the initial blank feed, being pivotally mounted on cross pin 25, preferably between the first and second dogs of the main series and having its tail pressed down by a spring 26 so that it is held against the stop 27 forming the top of the recess in advance of the pivot pin. Its head or feed end extends at right angles to its body crosswise of the slide at a point in advance of the end of the slide and, in its extreme forward position, in advance also of the end of the table 4 so that it alone at that time supports the rear edge of the final sub-blank. Accordingly its feed recess 28 is extended almost the full width of the feed slide so as to insure adequate support for the final sub-blank. This recess as in the other dogs is formed between the feed face 18, lip 19 and under surface 20. The top 21 above the lip 19 is preferably flat as in the other dogs. The edge or corner toward the initial blank feed is also well rounded, as shown in Fig. 2, so that a main blank cannot catch in the end of the recess, but is deflected over it and depresses the dog.

The means for operating the direct feed slide, shown in Figs. 1 and 6 and which is the same as that of Hendrickson except in mechanical details, includes a spring which after the front edge of the blank strikes the stop plate 2 holds the main blank and sub-blanks with yielding pressure against the stop plate at the close of the forward stroke and during the shearing of the blank end. The reciprocation of the slide 9 is effected from the power driven shaft 29 by eccentric 30, link 31, arms 32 and 32' on rock shaft 33, link 34, rod 35, sliding in bearings 36 in bracket 37 secured to the frame, housing 38, spring 39, short headed rod 40 and cross head 41 of slide.

In Fig. 1 the slide is nearing the end of its forward stroke which continues until the edge of the blank strikes the plate 2. Thereupon the eccentric and its operative connections to the spring, having a slight further movement, compress the spring and cause it to act as above described. The way in which the feed dogs beginning with the rearmost act to feed the blank and sub-blanks on successive forward strokes will be apparent.

The initial feed of the main blank (Figs. 1 and 7) is the same as the corresponding feed in the Hendrickson patent and may include blank magazine 42, pneumatic or other separator 43, feed ways 44, longitudinal and transverse guide strips, 45, 46 respectively, shaft 47, from which the feed slides 48 connected by yoke 49 are actuated, driven at a one to ten ratio from shaft 29 through worm 50 thereon meshing with worm wheel 51 on shaft 47, and operative connections from shaft 47 to the yoke 49 which consist of quick action cam, 52, bell crank 53—54 and excess strain link 55, which is of known structure having jaws 56, 57 which under the action of spring 58 grasp the wrist pin 59 on arm 54 of the lever but release it on overstrain. Eccentric 60 and operating knob 61 therefor have been added for purposes of manual release. Should the main blank jam in being fed to the feed slide 9 the jaw 57 of the release link would be forced down against pressure of the spring 58, permitting the wrist pin 59 to move out of its usual position.

This feed of the main blank is relatively slow during its first part and until the new blank overlaps and to some extent depresses those dogs in advance of the rearmost dog. It becomes, however, very rapid as the blank is slid over the feed dogs, all of which including the rearmost are in depressed position when this has occurred. As will appear on reference to Fig. 7 the movements referred to are effected by the cam 52, the abrupt portion 52' of which gives the quick cross motion, this being followed by the return produced by the portion 53".

I claim:

1. In a machine of the character described a feed slide having a fore and aft series of spaced bores, a series of cylindrical dogs fitting slidably in said bores, and means for maintaining them against rotation therein but with capability of limited individual axial movement, said bores being provided with means for venting the space below the dog.

2. In a machine of the character described, a feed slide, a fore and aft series of cylindrical feed dogs fitting bores in the feed slide for up and down movement therein, springs in said bores coaxial therewith and exerting upward pressure on said several dogs, and means for limiting the upward sliding movement of the dogs and maintaining their feed faces in correct relation transversely of the slide.

3. In a machine of the character described, a feed slide having a fore and aft series of spaced bores open at the top, a series of cylindrical dogs fitting slidably in said bores, transverse pin and slot connections between each dog and the slide, and individual springs urging said dogs upward.

4. In a machine of the character described, the structure set forth in claim 1 having associated therewith a feed dog pivoted on the feed slide at one side of the fore and aft series projecting in advance thereof and having its feed face extended across the axial plane of said series.

5. In a machine of the character described, a feed slide, a fore and aft series of feed dogs mounted thereon with the capacity of limited movement with respect thereto into and out of feed position, each of said dogs having a feed recess extending transversely of the slide, the foremost dog being pivoted, extending beyond the end of the slide and having a feed recess of greater length transversely of the slide than the feed recesses of the other dogs.

6. In a machine of the class described, a feed slide, a fore and aft series of cavities in said slide, a corresponding series of feed dogs vertically slotted, each located in one of said cavities, and having their movement limited and the correct location of their feed faces maintained by a series of parallel cross pins passing through the respective slots and located in the axial planes of the dogs.

7. In a machine of the character described, blank shearing means, a feed slide, a fore and aft series of feed dogs movably mounted thereon, and each having a feed recess extending transversely of the feed slide, means for reciprocating said feed slide to deliver blanks and sub-blanks to the blank shearing means, and a main or initial feed for transferring main blanks periodically crosswise of said feed slide to the feed to the blank shearing means, said feed dogs having the side of their heads toward the said main or initial feed rounded across the end of the feed recess to enable the edge of the blank to clear the same.

8. In a machine of the character described, a cylindrical feed dog having a feed face and slotted in the central axial plane including said face.

9. In a machine of the character described, a feed dog having a feed recess formed by a feed face and adjacent lip and under surface and having its head rounded at one side across the adjacent end of said recess.

10. In a machine of the character described, a feed dog carrier, a feed dog mounted for rectilinear reciprocation therein and having its feed face maintained in a plane, means constraining the feed face to reciprocation in that plane, and means for advancing the feed dog carrier.

11. In a machine of the character described, a feed dog carrier having therein a fore and aft series of spaced cavities, a series of feed dogs severally mounted for limited sliding endwise movement in said cavities and having a feed face, an under surface at the base of the feed face and an inclined lip projecting forward from the feed face over said surface, and means for limiting the projection of the dogs to locate said surface slightly below the top of the feed dog carrier.

12. In a machine of the character described, a feed dog carrier, a block of metal fitting slidably in a cavity of like shape in said carrier and constituting a feed dog, means for projecting the feed dog to feed position, and means for advancing the feed dog carrier.

13. In a machine of the character described, a feed dog carrier having a fore and aft series of spaced bores, a series of cylindrical dogs fitting slidably in the respective bores for in and out movement, means for projecting said individual dogs, stops for limiting such projection, means for venting the space within the bores below the dogs, and means for advancing the feed dog carrier.

14. In a machine of the character described, blank shearing means, a feed slide, a fore and aft series of feed dogs movably mounted thereon, means for reciprocating said feed slide to deliver blanks and sub-blanks to the blank shearing means, a main or initial feed slide mounted for reciprocation crosswise of the first feed slide, the rearmost feed dog of said series having its feed face shortened on the side towards the main blank feed as compared with feed dogs in advance of it to provide a clearance for the rear corner of the main blank when the blank overlaps the dogs of the series, and means for feeding the main blank over and across the feed dogs during the forward stroke of the first feed slide.

15. In a machine of the class described, a feed slide, a fore and aft series of cavities in the feed slide, feed dogs respectively fitting said cavities and mounted for limited in and out sliding movement therein, spring means for projecting said dogs, said cavities being vented below said dogs, means for reciprocating the feed slide endwise, and means for feeding a blank crosswise of said slide and thereby depressing dogs of the series in their vented cavities.

16. In a machine of the character described, a feed dog support, a fore and aft series of aligned, successively acting feed dogs mounted thereon for limited independent linear sliding bodily movement with respect thereto into and out of the plane of feed, and means for reciprocating said support.

17. In a machine of the character described, a feed dog support, a fore and aft series of aligned feed dogs mounted on said support for rectilinear reciprocation in sliding contact therewith, spring means for projecting said dogs individually, stops limiting their respective projection, and means for reciprocating said support endwise.

18. In a machine of the character described, a feed slide, a feed dog slidable endwise up and down in a cavity therein, a spring for projecting the feed dog, a stop for limiting such projection, and means for reciprocating said feed slide.

19. In a machine of the character described, blank shearing means, a feed slide, a fore and aft series of feed dogs mounted thereon with capacity of limited individual movement with respect thereto, the foremost dog having a greater range of movement and only the foremost dog being pivoted, means for actuating the respective feed dogs, and means for reciprocating said slide toward and from the shearing means, each dog having a feed recess.

20. In a machine of the character described, a feed slide, a fore and aft series of feed dogs fitting slidably for linear reciprocation therein and having feed recesses adapted to receive and slightly grip the blanks, and means for reciprocating the feed slide.

21. In a machine of the character described, a multi-dog feed having a feed dog carrier, a multiplicity of angularly fixed feed dogs mounted thereon for axial reciprocation into and out of feed position, means for projecting individual dogs, stops limiting dog projection, and means for reciprocating the feed dog carrier.

22. In a machine of the character described, a multi-dog feed having a feed dog carrier, a multiplicity of feed dogs received in said carrier in sliding contact therewith and arranged in a fore and aft row, spring means urging each dog axially toward feed position, stops limiting dog projection, and means for reciprocating the feed dog carrier.

23. In a machine of the character described, a feed dog carrier having bores, cylindrical dogs respectively fitting slidably in said bores, means maintaining them against rotation therein but with capability of limited individual axial movement, means for giving the dogs such movement and means for reciprocating the carrier.

24. In a machine of the character described, a feed dog slide having a fore and aft series of aligned equally spaced bores, a series of cylindrical feed dogs fitting respectively in the bores of said series and having feed faces in parallel transverse planes, spring means for projecting said dogs individually into feed position, stop means for each dog limiting its projection, means for angularly fixing each dog, and means for reciprocating the feed dog slide.

25. In a machine of the character described, a feed dog slide having a fore and aft series of aligned equally spaced cylindrical cavities having bottoms vented but otherwise closed, a series of cylindrical feed dogs fitting respectively in the cavities of said series, the bottom of each cavity and the bottom of the dog therein having opposed axial bores having bottoms, a coil spring seating in both bores of each aligned pair and reacting against their bottoms, stop means for limiting dog projection by the respective springs, and means for fixing the respective dogs in like angular relation in their cavities.

In testimony whereof, I have signed this specification.

GEORGE E. SNOW.